US012754722B2

(12) United States Patent
Silverstein et al.

(10) Patent No.: US 12,754,722 B2
(45) Date of Patent: Oct. 6, 2026

(54) EVALUATING AND REMEDIATING SOURCE CODE VARIABILITY

(71) Applicant: International Business Machines Corporation, Armonk, NY (US)

(72) Inventors: Zachary A. Silverstein, Georgetown, TX (US); Mary Diane Swift, Rochester, NY (US); Jonathan D. Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 18/318,799

(22) Filed: May 17, 2023

(65) Prior Publication Data

US 2024/0385818 A1 Nov. 21, 2024

(51) Int. Cl.
*G06F 8/41* (2018.01)
*G06F 8/70* (2018.01)

(52) U.S. Cl.
CPC ................ *G06F 8/437* (2013.01); *G06F 8/70* (2013.01)

(58) Field of Classification Search
CPC .................................. G06F 8/437; G06F 8/70
See application file for complete search history.

(56) References Cited

U.S. PATENT DOCUMENTS

| | | | | |
|---|---|---|---|---|
| 9,705,817 | B2 | 7/2017 | Lui et al. | |
| 10,061,613 | B1 | 8/2018 | Brooker et al. | |
| 11,140,032 | B2 | 10/2021 | Chaware et al. | |
| 11,503,061 | B1 * | 11/2022 | Lin | G06N 5/04 |
| 11,726,902 | B1 * | 8/2023 | Ganesan | G06F 11/0772 717/124 |
| 2003/0212661 | A1 * | 11/2003 | Avvari | G06F 11/3676 |
| 2005/0071810 | A1 * | 3/2005 | Sutter | G06F 8/443 717/165 |
| 2007/0143477 | A1 | 6/2007 | Kaminsky et al. | |

(Continued)

OTHER PUBLICATIONS

Sasaki, Takanori, et al. “Evaluation of Flexibility to Changes Focusing on the Variable Structures in Legacy Software.” Knowledge-Based Software Engineering: 11th Joint Conference, JCKBSE 2014, Volgograd, Russia, Sep. 17-20, 2014. Proceedings 11. Springer International Publishing, 2014. (Year: 2014).*

(Continued)

*Primary Examiner* — Joanne G Macasiano
(74) *Attorney, Agent, or Firm* — CANTOR COLBURN LLP; Caleb Wilkes

(57) ABSTRACT

Computer-implemented methods for providing source code with predictable performance characteristics are provided. Aspects include performing a static analysis on the source code to identify one or more functions of the source code and a type associated with each of the one or more functions and performing a dynamic analysis on the source code by executing the source code and capturing telemetry data for the execution of each of the one or more functions. Aspects also include calculating a source code execution variability score for each of the one or more functions based at least in part on the captured telemetry data and the type associated with each of the one or more functions. Based on a determination that the source code execution variability score associated with one of the one or more functions is above a threshold value, aspects include remediating the one of the one or more functions.

16 Claims, 3 Drawing Sheets

(56) References Cited

U.S. PATENT DOCUMENTS

| | | | | |
|---|---|---|---|---|
| 2011/0161918 | A1* | 6/2011 | Thomson | G06F 8/36 717/105 |
| 2013/0173781 | A1* | 7/2013 | Abuelsaad | G06F 9/5072 709/224 |
| 2014/0068569 | A1* | 3/2014 | Goldin | G06F 11/3612 717/130 |
| 2016/0350228 | A1* | 12/2016 | Hooker | G06F 12/127 |
| 2016/0357660 | A1* | 12/2016 | Dean | G06F 8/00 |
| 2017/0031800 | A1* | 2/2017 | Shani | G06F 11/34 |
| 2018/0285128 | A1* | 10/2018 | Clarke | G06F 11/3692 |
| 2018/0349119 | A1* | 12/2018 | Zaidi | G06F 8/4441 |
| 2019/0042391 | A1* | 2/2019 | Menon | G06F 11/3636 |
| 2019/0377560 | A1* | 12/2019 | Papageorgiou | G06F 8/4443 |
| 2020/0201741 | A1* | 6/2020 | Saha | G06F 8/30 |
| 2020/0379975 | A1* | 12/2020 | Kulkarni | G06F 16/2379 |
| 2022/0012019 | A1* | 1/2022 | Wilson-Thomas | H04L 63/12 |
| 2022/0206899 | A1 | 6/2022 | Kalamatianos et al. | |
| 2022/0350725 | A1* | 11/2022 | Lydick | G06F 8/48 |
| 2022/0391308 | A1* | 12/2022 | Brown | G06F 11/3692 |
| 2024/0184691 | A1* | 6/2024 | Murchison | G06F 11/3688 |
| 2024/0256423 | A1* | 8/2024 | Zhang | G06F 8/71 |

OTHER PUBLICATIONS

Levine, Sergey. "AI-Augmented Software Engineering: Automated Code Generation and Optimization Using Large Language Models." International Journal of Emerging Trends in Computer Science and Information Technology 1.4 (2020):21-29. (Year: 2020).*

Le Goues, Claire, et al. "Genprog: A generic method for automatic software repair." Ieee transactions on software engineering 38.1 (2011): 54-72. (Year: 2011).*

Rhein, Alexander Von, et al. Variability-aware static analysis at scale: (Year: 2018).*

Nguyen, Hung Viet, Christian Kästner, and Tien N. Nguyen. "Exploring variability-aware execution for testing plugin-based web applications." Proceedings of the 36th International Conference on Software Engineering. 2014. (Year: 2014).*

* cited by examiner

EVALUATING AND REMEDIATING SOURCE CODE VARIABILITY

BACKGROUND

The present invention generally relates to cloud computing systems, and more specifically, to computer systems, computer-implemented methods, and computer program products for evaluating and remediating variability in source code executed in a cloud computing environment.

Recently, there has been a large increase in the number of cloud computing systems that are available to companies. Each of the various cloud computing systems has different configurations that include various combinations of hardware and software elements. In addition, users typically access the cloud computing system via multiple different application programming interfaces (API), which can lead to unpredictable user experiences and potentially unpredictable results. In some cases, unpredictable results arise when system software suffers from a lack of idempotence. In general, an operation is idempotent if performing it multiple times yields the same result as performing it exactly once.

Given the difference in the configurations, and the multiple ways in which users access the cloud computing systems, ensuring consistent performance across the cloud computing systems is often a difficult task.

SUMMARY

Embodiments of the present invention are directed to a computer-implemented method for providing source code with predictable performance characteristics. According to an aspect, a computer-implemented method includes performing a static analysis on the source code to identify one or more functions of the source code and a type associated with each of the one or more functions and performing a dynamic analysis on the source code by executing the source code and capturing telemetry data for the execution of each of the one or more functions. The method also includes calculating a source code execution variability score for each of the one or more functions based at least in part on the captured telemetry data and the type associated with each of the one or more functions. Based on a determination that the source code execution variability score associated with one of the one or more functions is above a threshold value, the method also includes remediating the one of the one or more functions.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
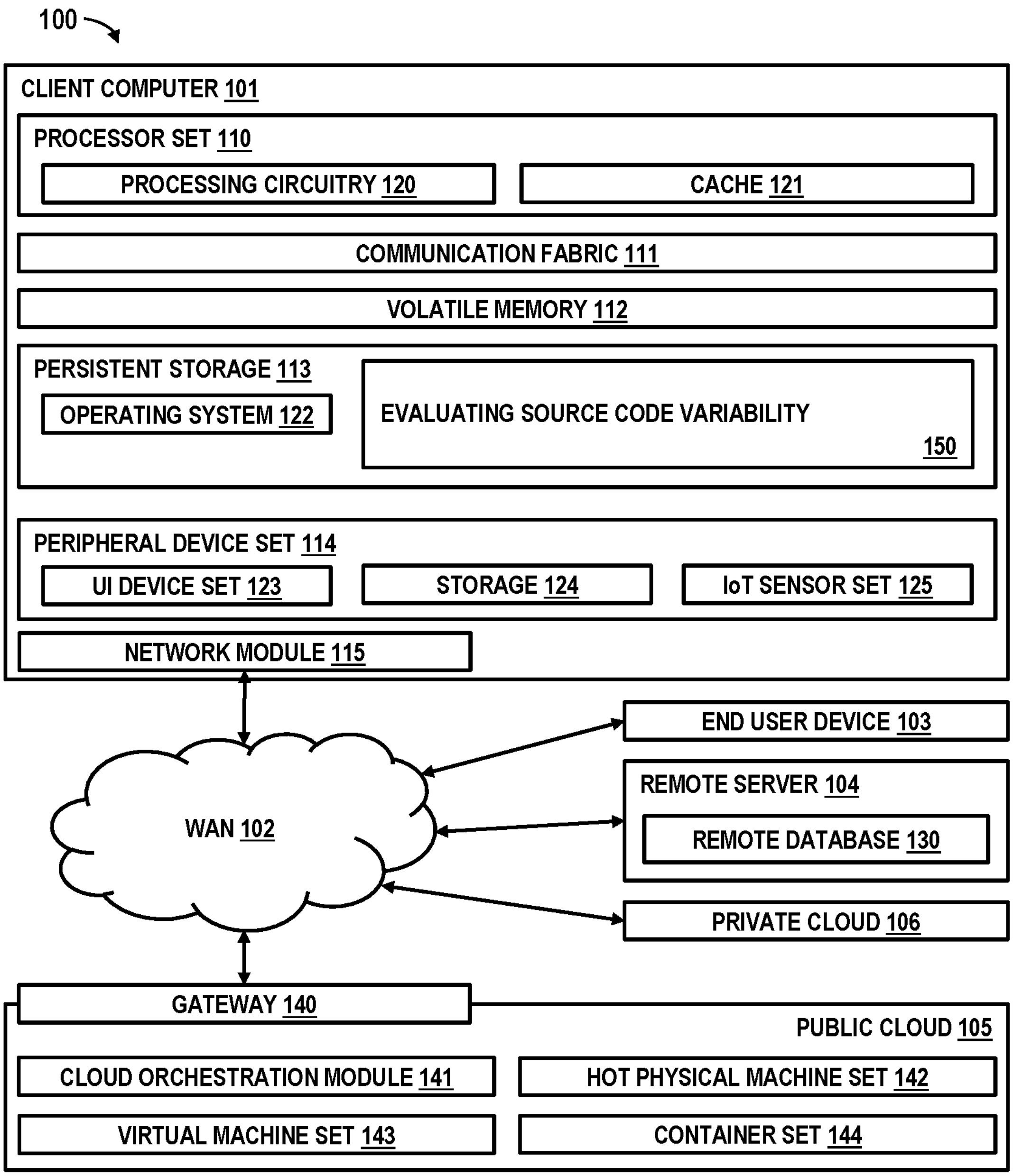
FIG. 1 depicts a block diagram of an example computer system for use in conjunction with one or more embodiments of the present invention.

As discussed above, ensuring consistent performance for the execution of source code across a cloud computing system is often a difficult task due, at least in part, to the multiple different ways in which users access the source code for execution. In exemplary embodiments, the variability for the execution of portions of source code is identified and remediated to provide consistent user experiences regardless of the ways in which user access the source code for execution. In exemplary embodiments, the source code is analyzed using both a static analysis and a dynamic analysis to identify portions of the source code that have undesirably high variability.

In exemplary embodiments, the static analysis includes identifying one or more functions in the source code and a type associated with each of the one or more functions. The dynamic analysis includes executing, or observing the execution of, the source code and recording telemetry data, i.e., performance metrics, that correspond to the execution of each of the one or more functions. The results of the static and dynamic analysis are then used to calculate a source code execution variability score for each of the one or more functions. The calculated source code execution variability score is then compared with one or more threshold values and a remediation action is performed based on the comparison.

In one embodiment, the remediation action can include flagging the one or more functions that have source code execution variability scores that exceed the threshold values for review by a software developer. In other embodiments, the remediation action can include automatically replacing a portion of the one of the one or more functions with a suitable alternative that has a lower variability score than the portion. In exemplary embodiments, automatically replacing a portion of the one of the one or more functions with a suitable alternative is performed by providing the one or more functions to a large language model and requesting that the large language model provide a suitable alternative to the source code that would have a more consistent execution time that the provided function.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as evaluating source code variability 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments described herein can utilize machine learning techniques to perform tasks. More specifically, one or more embodiments described herein can incorporate and utilize rule-based decision making and artificial intelligence (AI) reasoning to accomplish the various operations described herein, namely containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Figure 2:
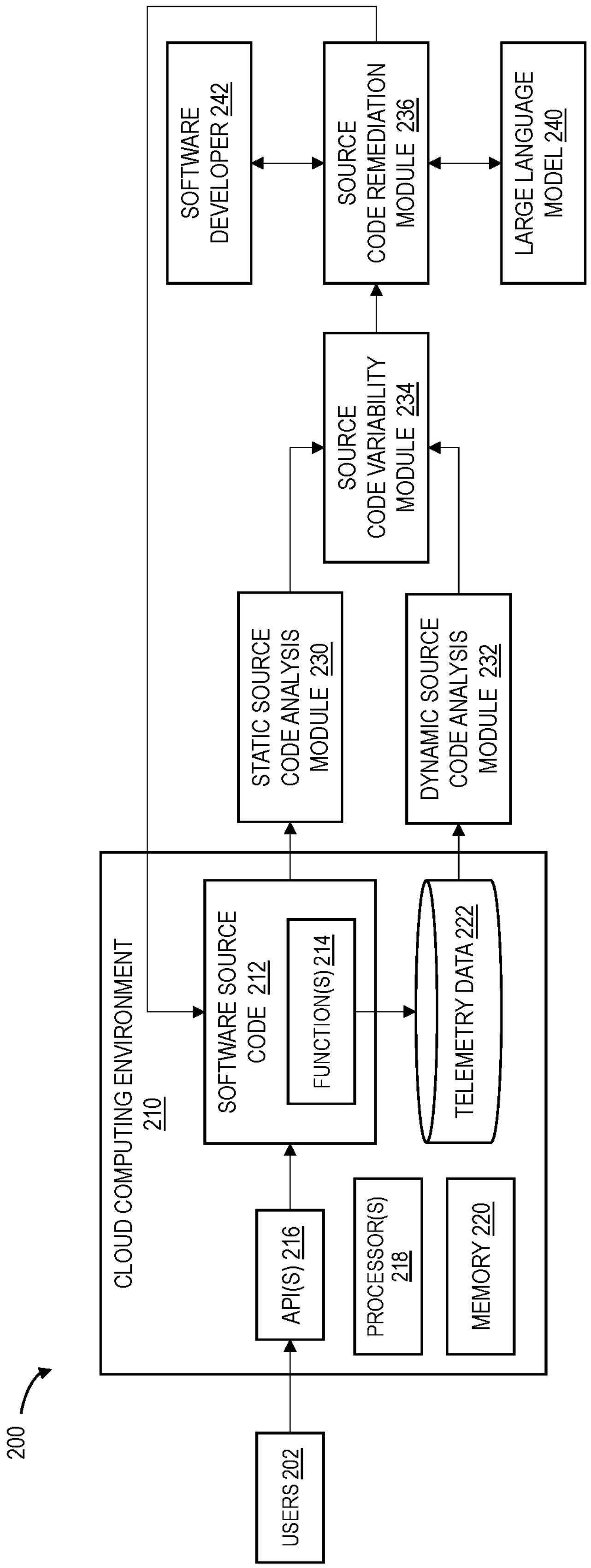
FIG. 2 depicts a schematic diagram illustrating a system for evaluating and remediating variability in source code executed in a cloud computing environment in accordance with one or more embodiments of the present invention.

Referring now to FIG. 2, a block diagram of a system 200 for evaluating and remediating variability in source code executed in a cloud computing environment 210 in accordance with one or more embodiments of the present invention is shown. In exemplary embodiments, one or more portions of the system 200 may be embodied in one or more computing environments 100, such as the one shown in FIG. 1. As illustrated, the cloud computing environment 210 includes a software source code 212 that includes one or more functions 214. The software source code 212 is accessed by users 202 via one or more application programming interfaces (APIs) 216. In a cloud computing environment 210 also includes one or more processors 218 and memory 220 that are configured to execute the software source code 212. In exemplary embodiments, the cloud computing environment 210 is configured to store telemetry data 222 that is captured during the execution of the software source code 212. The telemetry data 222 can include, but is not limited to, an execution time of the one or more functions 215, a state of the processor 218 before and after the execution of the one or more functions 214, and a state of the memory before and after the execution of the one or more functions 214.

In exemplary embodiments, the system 200 also includes a static source code analysis module 230 that is configured to analyze the software source code 212. In exemplary embodiments, the static source code analysis module 230 analyzes the software source code 212 to determine the types of code being executed. The static source code analysis module 230 can also perform an entity analysis to determine the proportion of code types, loops, declarations, primitives, and the like. In exemplary embodiments, the static source code analysis module 230 may use natural language processing techniques, or pattern matching techniques, to analyze the software source code 212 to identify a code type associated with the one or more function 214 of the source code. In exemplary embodiments, the static source code analysis module 230 is further configured to insert one or more flags into the software source code 212 as a result of the analysis, where the one or more flags cause the telemetry data 222 regarding the functions 214 to be captured.

In exemplary embodiments, the system 200 also includes a dynamic source code analysis module 232 that is configured to analyze the telemetry data 222 that is captured during the execution of the software source code 212. The dynamic source code analysis module 232 is configured to analyze the collected telemetry data 222 to determine a service or execution time for each of the functions 214 of the software source code 212. In addition, the dynamic source code analysis module 232 is configured to calculate a distribution of the service or execution times for each of the functions 214. In exemplary embodiments, calculating the distribution includes identifying a type of the distribution and calculating one or more parameters for the distribution. The parameters for the distribution may include, but are not limited to, a mean, a standard deviation, a skew, and a kurtosis. In one example, the distribution is identified as lognormal, the parameters include a mean, a median, and a standard deviation.

In exemplary embodiments, the system 200 also includes a source code variability module 232 that is configured to calculate a source code execution variability score for each of the one or more functions 214 based at least in part on the captured telemetry data 222 and the type associated with each of the one or more functions 214. In one embodiment, the dynamic source code analysis module 232 performs an analysis of variance analysis of the captured telemetry data 222 for functions 214 of the same, or similar type, to identify different performance and variance levels among the functions 214. The results of the analysis of variance analysis are used to calculate the source code execution variability score for each of the one or more functions 214. In exemplary embodiments, the source code execution variability score ranges from zero, which indicates no variability, and one, which indicates the highest level of variability.

In exemplary embodiments, the system 200 also includes a source code remediation module 236 that is configured to remediate the software source code 212 based on the source code execution variability score of each of the one or more functions 214 obtained from the source code variability module 232. In exemplary embodiments, the source code remediation module 236 is configured to compare the source code execution variability score of each of the one or more functions 214 to one or more threshold levels to determine whether a function 214 requires remediation and to determine a type of remediation to apply. In exemplary embodiments, the types of remediation include automated remediation and manual remediation. In exemplary embodiments, manual remediation includes providing one or more functions 214 of the software source code 212 to a software developer 242 that has a source code execution variability score that exceeds a threshold value. The manual remediation also includes replacing the one or more functions 214 of the software source code 212 with updated code received from the software developer 242.

In exemplary embodiments, automated remediation of the software source code 212 by the source code remediation module 236 includes providing one or more functions 214 of the software source code 212 to a large language model 240 that has a source code execution variability score that exceeds a threshold value. In addition, the source code remediation module 236 prompts the large language model 240 to generate a suitable alternative code to replace the provided one or more functions. For example, the one or more function of the original source code is provided to a large language model with a request that the large language model creates an alternative version of the source code that will have a more consistent execution time than the provided source code. The source code remediation module 236 then updates the source code by automatically replacing the portion of the one or more functions with the alternative version of the source code.

In exemplary embodiments, the system 200 also includes a large language model 240. The large language model 240 is a type of artificial intelligence system that is designed to understand and generate human language. These models are trained on massive amounts of text data and use statistical techniques to learn the patterns and structure of language. Large language models are typically based on neural networks, which are computational models that are inspired by the structure and function of the human brain. They consist of layers of interconnected nodes, and during training, the model adjusts the connections between these nodes to learn how to generate language.

Figure 3:
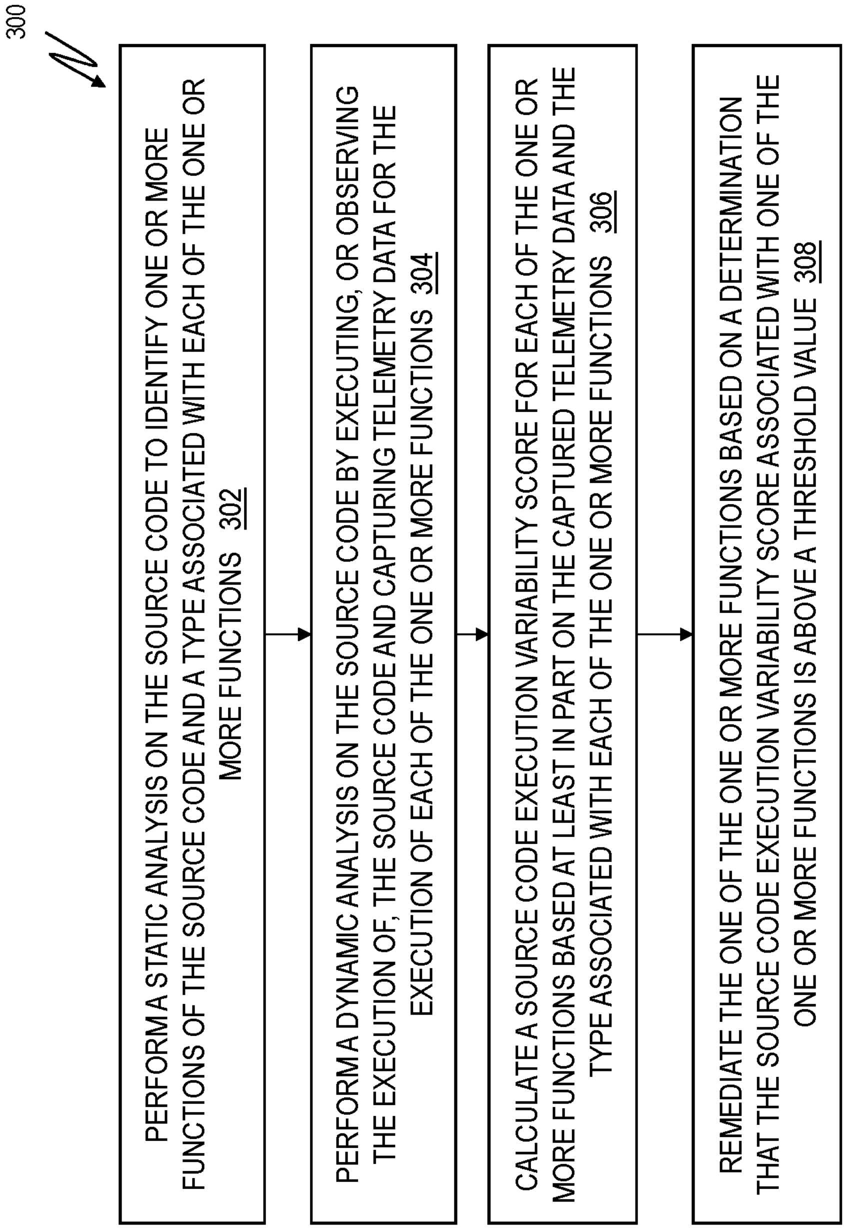
FIG. 3 is a flowchart diagram illustrating a method for evaluating and remediating variability in source code in accordance with one or more embodiments of the present invention.

Referring now to FIG. 3, a flowchart diagram illustrating a method 300 for evaluating and remediating variability in source code in accordance with one or more embodiments of the present invention. In exemplary embodiments, the method 300 is performed by a computing environment 100, such as the one shown in FIG. 1. As shown at block 302, the method 300 includes performing a static analysis on the source code to identify one or more functions of the source code and a type associated with each of the one or more functions. In exemplary embodiments, the type indicates one or more code structures or operations performed by the function. For example, the type may indicate that the function includes a recursive loop, an iterative loop, or the like. In another example, the type may indicate that the function performs a vector operation, a matrix operation, or the like.

Next, at block 604, the method 600 includes performing a dynamic analysis on the source code by executing, or observing the execution of, the source code and capturing telemetry data for the execution of each of the one or more functions. In exemplary embodiments, the dynamic analysis includes the execution of the one or more functions of the source code a threshold minimum number of times. For example, the dynamic analysis may require the source code to be executed at least a threshold number of times, such as 1,000 or more times, to collect an adequate data set of telemetry data for the one or more functions. In exemplary embodiments, the dynamic analysis includes performing an analysis of a variance of the captured telemetry data and the captured telemetry data includes an execution time associated with each of the one or more functions.

At block 606, the method 600 includes calculating a source code execution variability score for each of the one or more functions based at least in part on the captured telemetry data and the type associated with each of the one or more functions. In exemplary embodiments, the source code execution variability score is between zero and one and is based on a combination of a standard deviation of the captured telemetry data, a skew of the captured telemetry data, and a kurtosis of the captured telemetry data.

The method 600 concludes at block 608 by remediating the one of the one or more functions based on a determination that the source code execution variability score associated with one of the one or more functions is above a threshold value. In one embodiment, a type of remediation performed is based at least in part on a difference between the source code execution variability score and the threshold value. The types of remediation can include, but are not limited to, providing the source code to a software developer for the software developer to rewrite a portion of the source code. In these embodiments, the source code is provided to the developer with an indication of the one or more functions that have execution variability scores that exceed the threshold values, and the calculated source code execution variability score is also provided to the software developer.

In another embodiment, the types of remediation include automatically replacing a portion of the one of the one or more functions with a suitable alternative that has a lower variability score than the portion. In one embodiment, a large language model is utilized to generate the suitable alternative code to replace the portion of the one of the one or more functions. For example, the one or more function of the original source code is provided to a large language model with a request that the large language model creates an alternative version of the source code that will have a more consistent execution time than the provided source code. The remediation would then include updating the source code by automatically replacing the portion of the one of the one or more functions with the alternative version of the source code.

In exemplary embodiments, executing the source code includes executing the source code in a cloud computing environment in response to receiving an application program interface (API) call to perform the one or more functions. In one embodiment, the threshold value that is compared to the source code execution variability score for each of the one or more functions is based at least in part on a network traffic value in the cloud computing environment. For example, in cases where the network traffic in the cloud computing environment is higher than normal, the threshold used to identify a function that has an unacceptably high variance is also higher than normal. Likewise, in cases where the network traffic in the cloud computing environment is lower than normal, the threshold used to identify a function that has an unacceptably high variance is also lower than normal.

In another embodiment, the latency of API transaction calls is measured using additional measures of deviation. Such measures include (but are not limited to) skewness and kurtosis. For example, the combination of both a high skewness and kurtosis measurement may indicate a high-fidelity measurement of variability than using variance or standard deviation alone. Likewise, in cases of low skewness and kurtosis, such observations combined with variance, indicate a low degree of variability.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term “coupled” describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms “comprises,” “comprising,” “includes,” “including,” “has,” “having,” “contains” or “containing,” or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term “exemplary” is used herein to mean “serving as an example, instance or illustration.” Any embodiment or design described herein as “exemplary” is not necessarily to be construed as preferred or advantageous over other embodiments or designs. The terms “at least one” and “one or more” are understood to include any integer number greater than or equal to one, i.e. one, two, three, four, etc. The terms “a plurality” are understood to include any integer number greater than or equal to two, i.e. two, three, four, five, etc. The term “connection” can include both an indirect “connection” and a direct “connection.”

The terms “about,” “substantially,” “approximately,” and variations thereof, are intended to include the degree of error associated with measurement of the particular quantity based upon the equipment available at the time of filing the application. For example, “about” can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for providing a source code with predictable performance characteristics, the method comprising:

performing a static analysis on the source code to identify one or more functions of the source code and a type associated with each of the one or more functions;

defining a threshold minimum number of times for execution of the one or more functions of the source code to collect an adequate data set of telemetry data for the one or more functions;

performing a dynamic analysis on the source code by executing the source code and capturing the telemetry data for the execution of each of the one or more functions, a state of a processor before and after the execution of each of the one or more functions, and a state of a memory before and after the execution of each of the one or more functions and wherein the captured telemetry data includes an execution time associated with each of the one or more functions and wherein the dynamic analysis includes execution of the one or more functions of the source code at least the threshold minimum number of times;

calculating a source code execution variability score for each of the one or more functions based at least in part on the execution time, the state of the processor before and after execution, and the state of the memory before and after execution, and the type associated with each of the one or more functions;

based on a determination that the source code execution variability score associated with one of the one or more functions is above a threshold value, wherein the threshold value is based at least in part on a network traffic value in a cloud computing environment, remediating the one of the one or more functions, wherein the remediation includes prompting a large language model to create an alternative version of the one or more functions, wherein the alternative version is generated to reduce the source code execution variability score, wherein the alternative version of the one or more functions generated by the large language model is validated by executing the alternative version and comparing its execution variability score to the threshold value; and updating the source code by replacing the one or more functions with the alternative version, wherein executing the source code includes executing the source code in the cloud computing environment and receiving application program interface (API) calls to perform the one or more functions.

2. The method according to claim 1, wherein the remediating the one of the one or more functions comprises automatically replacing a portion of the one of the one or more functions with a suitable alternative that has a lower variability score than the portion.

3. The method according to claim 1, wherein the dynamic analysis includes performing an analysis of a variance of the captured telemetry data.

4. The method of claim 1, wherein the source code execution variability score is between zero and one and is based on a combination of a standard deviation of the captured telemetry data, a skew of the captured telemetry data, and a kurtosis of the captured telemetry data.

5. The method of claim 1, wherein a type of remediation performed is based at least in part on a difference between the source code execution variability score and the threshold value.

6. The method of claim 1, wherein the telemetry data further includes a state of a processor cache before and after the execution of each of the one or more functions.

7. The method of claim 1, wherein the static analysis comprises performing an entity analysis to determine a proportion of code types, loops, declarations, and primitives in the source code.

8. The method of claim 1, wherein the dynamic analysis includes identifying a type of distribution for the execution times of each of the one or more functions and calculating parameters for the distribution including at least one of mean, median, standard deviation, skew, or kurtosis.

9. The method of claim 1, wherein the remediation comprises providing the one or more functions to a software developer together with the calculated source code execution variability score for manual review and replacement.

10. A computing system having a memory having computer readable instructions and one or more processors for executing the computer readable instructions, the computer readable instructions controlling the one or more processors to perform operations comprising:

performing a static analysis on a source code to identify one or more functions of the source code and a type associated with each of the one or more functions;

defining a threshold minimum number of times for execution of the one or more functions of the source code to collect an adequate data set of telemetry data for the one or more functions;

performing a dynamic analysis on the source code by executing the source code and capturing telemetry data for the execution of each of the one or more functions, a state of the one or more processors before and after the execution of each of the one or more functions, and a state of the memory before and after the execution of each of the one or more functions and wherein the captured telemetry data includes an execution time associated with each of the one or more functions and wherein the dynamic analysis includes execution of the one or more functions of the source code the threshold minimum number of times;

calculating a source code execution variability score for each of the one or more functions based at least in part on the execution time, the state of the one or more processors before and after execution, and the state of the memory before and after execution, and the type associated with each of the one or more functions;

based on a determination that the source code execution variability score associated with one of the one or more functions is above a threshold value, wherein the threshold value is based at least in part on a network traffic value in a cloud computing environment, remediating the one of the one or more functions, wherein the remediation includes prompting a large language model to create an alternative version of the one or more functions, wherein the alternative version is generated to reduce the source code execution variability score, wherein the alternative version of the one or more functions generated by the large language model is validated by executing the alternative version and comparing its execution variability score to the threshold value; and updating the source code by replacing the one or more functions with the alternative version, wherein executing the source code includes executing the source code in the cloud computing environment and receiving application program interface (API) calls to perform the one or more functions.

11. The computing system of claim 10, wherein the remediating the one of the one or more functions comprises automatically replacing a portion of the one of the one or more functions with a suitable alternative that has a lower variability score than the portion.

12. The computing system of claim 10, wherein the dynamic analysis includes performing an analysis of a variance of the captured telemetry data.

13. The computing system of claim 10, wherein the source code execution variability score is between zero and one and is based on a combination of a standard deviation of the captured telemetry data, a skew of the captured telemetry data, and a kurtosis of the captured telemetry data.

14. The computing system of claim 10, wherein a type of remediation performed is based at least in part on a difference between the source code execution variability score and the threshold value.

15. A computer program product comprising a computer readable storage medium having program instructions embodied therewith, the program instructions executable by a processor to cause the processor to perform operations comprising:

performing a static analysis on a source code to identify one or more functions of the source code and a type associated with each of the one or more functions;

defining a threshold minimum number of times for execution of the one or more functions of the source code to collect an adequate data set of telemetry data for the one or more functions;

performing a dynamic analysis on the source code by executing the source code and capturing telemetry data for the execution of each of the one or more functions, a state of the processor before and after the execution of each of the one or more functions, and a state of a memory before and after the execution of each of the one or more functions and wherein the captured telemetry data includes an execution time associated with each of the one or more functions and wherein the dynamic analysis includes execution of the one or more functions of the source code the threshold minimum number of times;

calculating a source code execution variability score for each of the one or more functions based at least in part on the execution time, the state of the processor before and after execution, and the state of the memory before and after execution, and the type associated with each of the one or more functions; and based on a determination that the source code execution variability score associated with one of the one or more functions is above a threshold value, wherein the threshold value is based at least in part on a network traffic value in a cloud computing environment, remediating the one of the one or more functions, wherein the remediation includes prompting a large language model to create an alternative version of the one or more functions, wherein the alternative version is generated to reduce the source code execution variability score, wherein the alternative version of the one or more functions generated by the large language model is validated by executing the alternative version and comparing its execution variability score to the threshold value; and updating the source code by replacing the one or more functions with the alternative version, wherein executing the source code includes executing the source code in the cloud computing environment and receiving application program interface (API) calls to perform the one or more functions.

16. The computer program product of claim 15, wherein the remediating the one of the one or more functions comprises automatically replacing a portion of the one of the one or more functions with a suitable alternative that has a lower variability score than the portion.

* * * * *